(12) United States Patent
Xu et al.

(10) Patent No.: US 9,491,644 B2
(45) Date of Patent: Nov. 8, 2016

(54) METHOD AND DEVICE FOR DETERMINING RESUMPTION OF SUSPENDED MULTIMEDIA BROADCAST MULTICAST SERVICE, AND USER EQUIPMENT

(75) Inventors: Hui Xu, Shenzhen (CN); Zijiang Ma, Shenzhen (CN); Bin Wang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 210 days.

(21) Appl. No.: 13/881,370

(22) PCT Filed: Jun. 20, 2011

(86) PCT No.: PCT/CN2011/075994
§ 371 (c)(1),
(2), (4) Date: Apr. 24, 2013

(87) PCT Pub. No.: WO2012/126210
PCT Pub. Date: Sep. 27, 2012

(65) Prior Publication Data
US 2013/0215761 A1   Aug. 22, 2013

(30) Foreign Application Priority Data

Mar. 21, 2011 (CN) .......................... 2011 1 0068012

(51) Int. Cl.
*H04W 24/08* (2009.01)
*H04W 48/12* (2009.01)
*H04L 12/18* (2006.01)
*H04W 72/12* (2009.01)
*H04W 4/06* (2009.01)

(52) U.S. Cl.
CPC ............. *H04W 24/08* (2013.01); *H04W 48/12* (2013.01); *H04L 12/1881* (2013.01); *H04W 4/06* (2013.01); *H04W 72/1289* (2013.01)

(58) Field of Classification Search
None
See application file for complete search history.

(56) References Cited

U.S. PATENT DOCUMENTS

| 8,144,735 B2 * | 3/2012 | Vayanos ............... H04W 48/12 370/312 |
| 2005/0190712 A1 * | 9/2005 | Lee et al. ...................... 370/312 |
| 2010/0189027 A1 * | 7/2010 | Ishida et al. .................. 370/312 |

(Continued)

FOREIGN PATENT DOCUMENTS

| CN | 1801961 A | 7/2006 |
| CN | 101267580 A | 9/2008 |

(Continued)

OTHER PUBLICATIONS

P.R. China, State Intellectual Property Office, International Search Report for International Application No. PCT/CN2011/075994, mailed Jan. 5, 2012.

*Primary Examiner* — Vinncelas Louis
(74) *Attorney, Agent, or Firm* — Bright IP Law Offices (57) ABSTRACT

Provided is a method for determining the resumption of a suspended Multimedia Broadcast Multicast Service (MBMS), which includes: when the MBMS service is intended to be resumed after being suspended, triggering a network side to send an MBMS Control Channel (MCCH) notification message for indicating to change an MCCH message; determining, by User Equipment (UE), that the suspended MBMS service is resumed by reading the MCCH notification message and the changed MCCH message. A device and a UE for determining the resumption of an MBMS is also provided.

13 Claims, 5 Drawing Sheets

(56) References Cited

U.S. PATENT DOCUMENTS

| | | | |
|---|---|---|---|
| 2010/0234032 A1* | 9/2010 | Chun | H04W 72/005 455/450 |
| 2010/0303023 A1* | 12/2010 | Nader | H04W 72/005 370/329 |
| 2011/0085489 A1* | 4/2011 | Rydnell et al. | 370/312 |
| 2012/0202493 A1* | 8/2012 | Wang et al. | 455/435.1 |

FOREIGN PATENT DOCUMENTS

| | | |
|---|---|---|
| CN | 101433100 A | 5/2009 |
| CN | 101909242 A | 12/2010 |

* cited by examiner

METHOD AND DEVICE FOR DETERMINING RESUMPTION OF SUSPENDED MULTIMEDIA BROADCAST MULTICAST SERVICE, AND USER EQUIPMENT

CROSS REFERENCE TO RELATED APPLICATIONS

This application is the U.S. National Stage of International Patent Application No. PCT/CN2011/075994 filed on Jun. 20, 2011, which claims priority to Chinese Patent Application No. 201110068012.4 filed on Mar. 21, 2011. Both the PCT Application and Chinese Application are hereby incorporated by reference in their entirety.

FIELD OF THE INVENTION

The disclosure relates to a technology for determining the resumption of a suspended Multimedia Broadcast Multicast Service (MBMS), and in particular to a method and a device for determining the resumption of the suspended MBMS service, and User Equipment (UE).

BACKGROUND OF THE INVENTION

With the rapid development of Internet and the popularity of big-screen multi-function mobile terminals, a lot of mobile data multimedia services and various high-bandwidth multimedia services have emerged, such as video conference, television broadcast, video on demand, advertisement, online education, interactive game and the like; this aspect not only meets the requirement of a mobile user on multiple services, but also brings a new business growth to a mobile operator. These mobile data multimedia services require that multiple users can receive the same data simultaneously, and have advantages of big data amount, long duration; delay sensitivity and the like compared with a general data service.

In order to utilize a mobile network resource effectively, the $3^{rd}$ Generation Partnership Project (3GPP) proposes an MBMS service that is a technology for transmitting data from one data source to a plurality of target mobile terminals; this technology realizes sharing of network resources (including a core network and an access network) and improves the utilization rate of the network resource (particularly an air interface resource). The MBMS service defined by the 3GPP not only can realize multicast and broadcast of messages of low-rate plain texts, but also can realize multicast and broadcast of high-rate multimedia services and provide a variety of videos, audios and multimedia services. The MBMS service undoubtedly follows a trend of the future development of mobile data and provides a better business prospect for the development of 3G.

At present, the MBMS technology is introduced in a Release 9 (R9) of a Long Term Evolution (LTE) system and is enhanced in a Release 10 (R10). In the R9, control signaling and user data of the MBMS service are separately transmitted and are respectively called a Control Plane (CP) and a User Plane (UP). The CP controls the sending of the UP data by controlling start, update and end of a service, so as to implement the sending of the basic MBMS service. The MBMS service is sent in an MBMS Single Frequency Network (MBSFN) area (statically or semi-statically configured) with a fixed size. In the R10, in order to improve the resource utilization rate of an MBMS system and to facilitate the management of an operator, the MBMS technology is enhanced, mainly including the following two enhancements:

1. Introduction of an MBMS Counting mechanism. The main principle of the MBMS Counting mechanism is that: a Multi-cell/multicast Coordination Entity (MCE) sends a Counting request of some MBMS service to an evolved NodeB (eNB) through an M2 interface; the eNB sends the Counting request to a UE on a Multicast Control Channel (MCCH); the UE that is receiving the MBMS service in a connected state feeds back to the eNB a receiving state of the MBMS service being received by the UE; and then eNB reports the feedback result to the MCE. The purpose of the introduction of the Counting mechanism is to facilitate an operator to count the receiving state of some MBMS service and suspend/resume (or activate/deactivate) the service according to the receiving state, so as to improve the utilization rate of radio network resources.

2. Introduction of a service priority based resource pre-emption technology, namely, Allocation and Retention Priority (ARP). The main principle of the resource pre-emption technology is that: when a resource is tense, an MBMS service with a higher priority can pre-empt the resource of another MBMS service with a lower priority. When the resource is pre-empted by the service with a higher priority, the service with a lower priority is suspended; when a network has a new radio resource, the suspended service can be resumed to be sent.

Both the counting and the resource pre-emption are initiated by the MCE; the range of the counting and the resource pre-emption generally is in a Multicast Broadcast Single Frequency Network (MBSFN) area. The MBMS service being suspended means that: the MCE notifies the eNB to release a corresponding radio resource; a corresponding service context in the eNB is reserved; the eNB may exit or not exit a corresponding IP multicast group; after suspension, the UE stops periodically reading an MCCH message but monitors an MCCH notification message corresponding to the MBMS service. The MBMS service being resumed means that: the MCE notifies the eNB to reallocate a radio resource, if the eNB has exited the IP multicast group, the eNB rejoins the IP multicast group, continues transmitting the MBMS service adopting an MBSFN mode and periodically reads the MCCH message.

An ARP parameter involved in the resource pre-emption comes from an Evolved Packet Core (EPC) and can be sent to the MCE from an M3 interface through an MBMS session station request message.

During the study and practice process of the present technology, it is found that the present technology has problems as follows: a 3GPP Rel-10 MBMS adopts an MCCH change notification (hereinafter called MCCH notification) mechanism, that is, a change of an MCCH is indicated by using a specific MBMS Radio Network Temporary Identifier (M-RNTI) and Downlink Control Information (DCI) on a Physical Downlink Control Channel (PD-CCH); here, the change is only for a session start or counting request event, that is, a network side sends an MCCH notification message only when the session start or counting request event occurs; if the MCE suspends a certain MBMS service according to a counting report or an ARP requirement, for a UE that is receiving or interested in receiving the MBMS service, the MBMS service is stopped; the UE monitors the MCCH notification message and waits a restart of the service. After a period of time, the MBMS service above is resumed; however, the MCCH notification at this moment cannot indicate that the service is resumed, and the UE does not continue reading content on the MCCH periodically, thus the UE cannot know that the MBMS service has been resumed; therefore, the UE cannot receive the resumed MBMS service immediately.

SUMMARY OF THE INVENTION

In view of the problems above, the main purpose of the disclosure is to provide a method and a device for determining the resumption of a suspended MBMS service, and a UE, in which the UE can acquire indication information of the resumption of the suspended MBMS service as soon as possible so that the UE can resume reception of the suspended MBMS service as soon as possible.

In order to achieve the purpose above, the technical solution of the disclosure is realized as follows:

the disclosure provides a method for determining the resumption of a suspended MBMS service, which comprises:

when the MBMS service is intended to be resumed after being suspended, triggering a network side to send an MCCH notification message for indicating a change of an MCCH message; and determining, by a UE, that the suspended MBMS service is resumed by reading the MCCH notification message and a changed MCCH message.

Preferably, the MBMS service being suspended does not include an MBMS service interruption caused by the network side sending an MBMS session stop request message, or an MBMS service interruption caused by the UE's own behaviour.

Preferably, the changed MCCH message refers to an MCCH message updated in a next MCCH modification period.

Preferably, after determining, by the UE, that the suspended MBMS service is resumed by reading the MCCH notification message and the changed MCCH message, the method further comprises:

the UE resuming reception of the MCCH and receiving the resumed MBMS service again.

Preferably, when the MBMS service is suspended, the network side suspends the MCCH notification message corresponding to the MBMS service.

Preferably, the MCCH notification message is an MCCH change notification message; and the network side is an eNB.

The disclosure provides a method for determining resumption of a suspended MBMS service, which comprises:

a UE continuing reading an MCCH periodically after determining that the MBMS service is suspended, and determining that the suspended MBMS service is resumed when the MCCH contains indication information of the suspended MBMS service.

Preferably, the MBMS service being suspended does not include an MBMS service interruption caused by a network side sending an MBMS session stop request message, or an MBMS service interruption caused by the UE's own behaviour.

Preferably, after the UE determining that the suspended MBMS service is resumed, the method further comprises:

receiving, by the UE, the resumed MBMS service again.

The disclosure provides a device for determining resumption of a suspended MBMS service, which comprises: a resumption unit and an indication unit that are located at a network side, and a receiving unit and a determination unit that are located at a UE side, wherein the resumption unit is configured to resume the suspended MBMS service and trigger a sending unit;

the sending unit is configured to send an MCCH notification message for indicating a change of an MCCH message;

the receiving unit is configured to receive the MCCH notification message and a changed MCCH message;

the determination unit is configured to determine that the suspended MBMS service is resumed according to the MCCH notification message and the changed MCCH message.

Preferably, the changed MCCH message refers to an MCCH message updated in a next MCCH modification period.

Preferably, the device further comprises:

a reading unit configured to resume reception of the MCCH after the determination unit determines that the suspended MBMS service is resumed and to receive the resumed MBMS service again using the receiving unit.

The disclosure provides a device for determining resumption of a suspended MBMS service, which comprises: a first determination unit, a reading unit and a second determination unit, wherein the first determination unit is configured to trigger a reading unit after determining that the MBMS service is suspended;

the reading unit is configured to continue reading an MCCH periodically;

the second determination unit is configured to determine that the suspended MBMS service is resumed when determining that the MCCH contains indication information of the suspended MBMS service.

Preferably, the device further comprises:

a receiving unit configured to receive the resumed MBMS service again after the second determination unit determines that the suspended MBMS service is resumed.

The disclosure provides a UE having an MBMS information reception capacity, which comprises a receiving unit and a determination unit, wherein the receiving unit is configured to receive an MCCH notification message and an MCCH message;

the determination unit is configured to determine that a suspended MBMS service is resumed.

The disclosure provides a UE having an MBMS information reception capacity, which comprises the forgoing device for determining resumption of a suspended MBMS service including the first determination unit, the reading unit, the second determination unit and the receiving unit above.

In the disclosure, when the suspended MBMS service is resumed, the network side actively notifies the UE that the suspended MBMS service has been resumed; or, the UE continues reading the MCCH after determining that the MBMS service is suspended, so as to perform the reception of the resumed MBMS service the first time when the suspended MBMS service is resumed. The disclosure avoids the problem that the UE cannot know when the suspended MBMS service is resumed, so that the UE can immediately receive the MBMS service that is resumed after being suspended. The technical solution of the disclosure provides a better supplement for the reception of an MBMS service in a present MBMS system and further improves Quality of Service (QoS) of the MBMS system and a UE user's experience.

DETAILED DESCRIPTION OF THE EMBODIMENTS

The basic idea of the disclosure is that: when a suspended MBMS service is resumed, a network side actively notifies a UE that the suspended MBMS service has been resumed; or, the UE continues reading an MCCH after determining that the MBMS service is suspended, so as to receive the resumed MBMS service the first time when the suspended MBMS service is resumed.

For a better understanding of the purpose, technical solution and advantages of the disclosure, embodiments are provided hereinafter to illustrate the disclosure in detail wither reference to the accompanying drawings.

Figure 1:
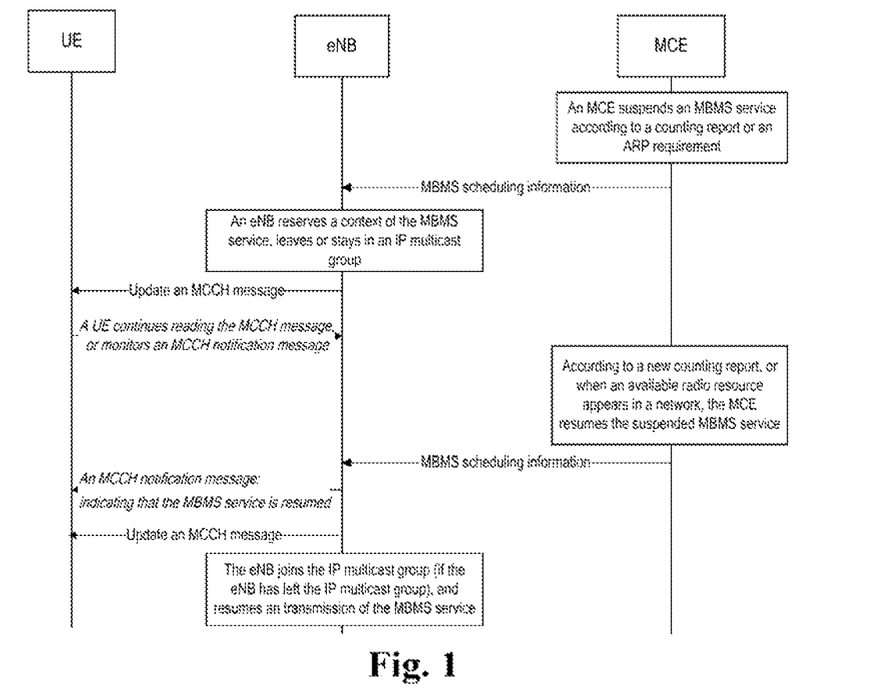
FIG. 1 shows a flowchart of a method for determining the resumption of a suspended MBMS service of the disclosure.

FIG. 1 shows a flowchart of a method for determining the resumption of a suspended MBMS service of the disclosure; bold italic parts in FIG. 1 are the key points of the technical solution of the disclosure; as shown in FIG. 1, in an MBMS system, a network side suspends a certain MBMS service according to a counting report or an ARP requirement and a UE continues reading an MCCH message periodically, or, when the network side is intended to resume the suspended MBMS service, the network side is triggered to send an MCCH notification message, the UE reads the MCCH message according to the MCCH notification message and further receives the MBMS service according to the MCCH message, so as to meet the requirement that the UE immediately reads the resumed MBMS service.

The counting result mentioned above is for an MBMS service and is obtained by the following procedures: an MCE sends a counting request to an eNB in an MBSFN area; the eNB sends the counting request to a UE in the MBSFN area; the UE that is receiving or interested in receiving the MBMS service sends a counting response to the eNB; the eNB collects the counting response from the UE and then sends a counting report to the MCE; the MCE determines whether to suspend the MBMS service according to the counting report, if the average number of the UE participating in counting at each cell is less than 1, the MCE can suspend the corresponding MBMS service. Of course, the specific policy for suspending an MBMS service is set by a network operator; a corresponding MBMS service also can be suspended when the average number of UE participating in counting at each cell is less than 5. In this disclosure, the suspension means that the MCE notifies the eNB to release a corresponding radio resource of the MBMS service, the eNB reserves a context of the MBMS service (the context here refers to some identifier information related to the MBMS service) and the eNB may leave or not leave a corresponding IP multicast group.

In the disclosure, an ARP requirement means that, when a radio resource in the MBSFN area is limited, an MBMS service with a higher priority can pre-empt the resource of another MBMS service with a lower priority, which is called pre-emption too. For the MBMS service with a lower priority of which the resource is pre-empted, the network side suspends this MBMS service.

For a suspended MBMS service, the MCE indicates the suspension through MBMS scheduling information; specifically, the MCE indicates the suspension by deleting an MBMS session in an MCCH on an air interface. After a period of time, the suspended MBMS service can be resumed; the resumption means that the MCE notifies the eNB to reallocate a radio resource, the eNB joins a corresponding IP multicast group (if the eNB leaves the multicast group during suspension) and the MBMS service retransmits the suspended MBMS service through the MBSFN; the MCE indicates that the suspended MBMS service is resumed through the MBMS scheduling information; specifically, the MCE indicates that the MBMS service is resumed by adding a corresponding MBMS session in the MCCH on the air interface.

Given that the suspended MBMS service has no indication in the MCCH (the suspended MBMS service has been deleted), the UE might stop reading the MCCH periodically, but monitor an MCCH notification message (namely, monitor a notification channel); when the suspended MBMS service is resumed, the MCCH notification message does not include the resumption information of the MBMS service, nor does the UE read the MCCH message; therefore, the UE does not know that the MBMS service is resumed; thus the UE might not receive the needed MBMS service immediately. In order to solve the problems above, the disclosure provides two solutions, which respectively are:

Solution 1: for a suspended MBMS service, a UE continues reading a corresponding MCCH of the MBMS service periodically;

Solution 2: when a suspended MBMS service is resumed, a network side indicates that the suspended service is resumed through an MCCH change notification message.

For a UE in the R10, both the two solutions above can solve the problem of reception of a resumed MBMS service; for a UE in the R9, the Solution 1 is the function enhancement of the UE. Given that the function of the UE in the R9 is solidified, this solution is difficult to implement and the UE needs to be updated; the Solution 2 is a solution for a network side, and it has no requirement on a UE's capability. Therefore, the UE in the R9 can continue receiving the resumed MBMS service; and no special update is needed for the UE in the R9.

For a UE that is receiving or interested in receiving an MBMS service, the solution 2 can notify the resumed MBMS service to each UE that is receiving or intended to receive the MBMS service; the solution 1 can solve the reception problem for the UE when the MBMS service the UE is receiving is resumed after being suspended; however, for the UE that is interested in receiving the MBMS service, since the UE needs to monitor an MCCH change notification, the reception problem for the UE that is interested in receiving the MBMS service when the MBMS service is resumed after being suspended cannot be solved.

In this disclosure, the MBMS service being suspended does not include an MBMS service interruption caused by the network side sending an MBMS session stop request message, or an MBMS service interruption caused by the UE's own behaviour.

The essence of the technical solution of the disclosure is further described below through specific application examples.

Application Example 1

The application scenario of this application example is that: an MCE decides to suspend a certain MBMS service according to a counting report; after a period of time, the MCE decides to resume the MBMS service according to a new counting report and adopts the technical solution described in the Solution 1 to perform reception of the resumed MBMS service. Namely, after the UE receives a notification from a network side that the MBMS service is suspended, the UE does not stop reading an MCCH corresponding to the suspended MBMS service, but continues reading the MCCH corresponding to the suspended MBMS service periodically; once after determining that the MCCH contains related control information of the suspended MBMS service, the UE receives the MBMS service on a corresponding data channel bearing the MBMS service according to an control information indication of the suspended MBMS service (at this time, the MBMS service has been resumed). Reading the MCCH and receiving the MBMS service indicated by the MCCH belong to a conventional technology and are not the key points of the technical solution of this disclosure; thus no further description of implementation details is needed here.

Application Example 2

The application scenario of this application example is that: an MCE decides to suspend a certain MBMS service based on an ARP requirement; after a period of time, an available radio resource appears in a system, and the MCE decides to resume the MBMS service and adopts the technical solution described in the Solution 1 to perform reception of the resumed MBMS service. The specific implementation way is the same as that of the Application Example 1, and no further description is needed here.

Application Example 3

The application scenario of this application example is that: an MCE decides to suspend a certain MBMS service according to a counting report; after a period of time, the MCE decides to resume the MBMS service according to a new counting report and adopts the technical solution described in the Solution 2 to perform the notification of the resumed MBMS service. Namely, when a network side suspends the MBMS service for a period of time and needs to resume the suspended MBMS service, the network side is triggered to send an MCCH notification message indicating a change of an MCCH message to each UE. In this disclosure, the MCCH notification message bearing a resumed channel of the suspended MBMS service is an MCCH change notification message.

Application Example 4

The application scenario of this application example is that: an MCE decides to suspend a certain MBMS service based on an ARP requirement; after a period of time, an available radio resource appears in a system, and the MCE decides to resume the MBMS service and adopts the technical solution described in the Solution 2 to perform notification of the resumed MBMS service. The specific implementation way is the same as that of the Application Example 1, and no further description is needed here.

The essence of the technical solution of the disclosure is further illustrated below through specific embodiments.

Embodiment 1

Figure 3:
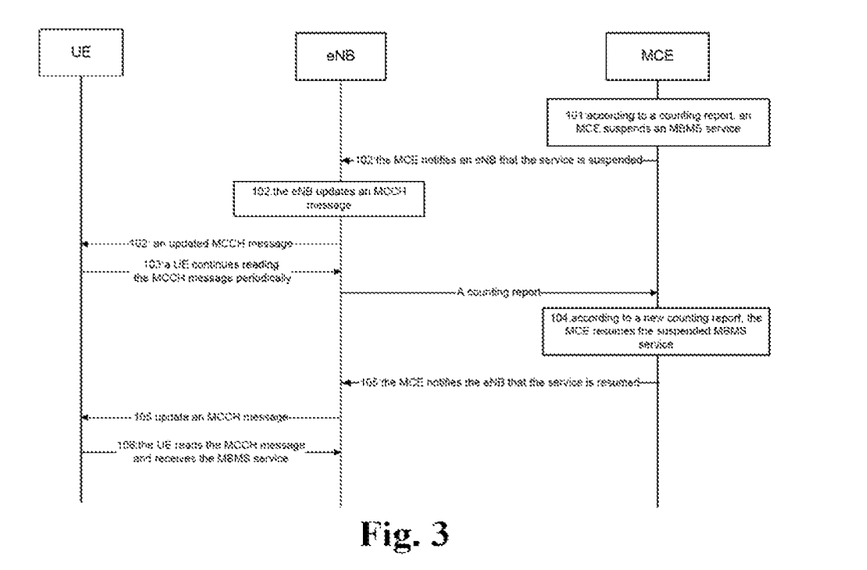
FIG. 3 shows a flowchart of an Embodiment 1 of a method for determining the resumption of a suspended MBMS service of the disclosure.

The application scenario of this embodiment is that: an MCE decides to suspend a certain MBMS service according to a counting report; after a period of time, the MCE decides to resume the MBMS service according to a new counting report and adopts the technical solution described in the Solution 1 to perform reception of the resumed MBMS service. FIG. 3 shows a flowchart of the Embodiment 1 of a method for determining the resumption of a suspended MBMS service of the disclosure; as shown in FIG. 3, this embodiment specifically comprises the following steps:

Step 101: an MCE decides to suspend a certain MBMS service according to a counting report in an MBSFN area.

The counting report refers to a counting report sent by an eNB in the MBSFN area to the MCE according to a counting request message: generally, the counting report can set a threshold (for example, one UE counted at each cell on average); if the counting report exceeds the threshold, the MBMS service can be transmitted adopting the MBSFN; otherwise, the MBMS service is suspended.

The MBMS service being suspended means that: the MCE notifies the eNB in the MBSFN area to release a corresponding radio resource of the MBMS service through MBMS scheduling information; the eNB reserves a context of the MBMS service; the eNS leaves or stays in an IP multicast group (to leave or not is related to a specific implementation of the eNB); the eNB stops an MBSFN transmission of the MBMS service; the eNB updates an MCCH message and deletes the suspended MBMS service from the updated MCCH message;

the suspended MBMS service can be cached in the eNB;

the context of the MBMS service includes, but is not limited to: MBMS service identifier, MBMS service suspension time identifier (that is, MBMS service stop time), MBSFN area identifier of the MBMS service, and the like;

the MBMS service can be a service being sent or to be sent.

Step 102: the MCE sends MBMS scheduling information to an eNB to indicate that the MBMS service is suspended; and the eNB updates an MCCH message.

Indicating that the MBMS service is suspended means that: the MCE sends an indication of the MBMS scheduling information to the eNB in the MBSFN area through an M2 interface and deletes the suspended MBMS service from the MBMS scheduling information;

the step that the eNB updates the MCCH message means that the eNB deletes the suspended MBMS service in the MCCH;

the MCE can notify a corresponding MME after suspending the MBMS service.

Step 103: after the MBMS service is suspended, a UE continues reading the MCCH message periodically.

The UE refers to a UE that is receiving the MBMS service before suspension, namely, although the UE has not received control information of the needed MBMS service on the MCCH for a while, the UE continues reading the MCCH message until the MBMS service is resumed;

the period refers to an MCCH modification period and a repetition period:

the MCCH message refers to an MCCH message corresponding to the suspended MBMS service;

the eNB can tell the resumed MBMS service from a new MBMS service, because the eNB saves the context of the suspended MBMS service.

In order to enable the UE to continue reading the MCCH message corresponding to the suspended MBMS service periodically, the eNB can indicate the suspended MBMS service in the MCCH message.

Step 104: after a period of time, the MCE decides to resume an MBSFN transmission of the MBMS service according to a new counting report.

The length of the period of time relates to an interval of the counting report, an MCCH modification period, a specific implementation of the MCE and a counting policy;

resuming the transmission of the MBMS service means that: the MCE notifies the eNB in the MBSFN area to reallocate a corresponding radio resource of the MBMS service through MBMS scheduling information, if the eNB has left an IP multicast group (to leave or not is related to the specific implementation of the eNB), the eNB rejoins the IP multicast group; the eNB restarts the MBSFN transmission of the MBMS service; the eNB updates the MCCH message and adds the resumed MBMS service in the updated MCCH message;

the MCE can notify a corresponding MME after resuming the MBMS service.

Step 105: the MCE notifies the eNB that the MBMS service is resumed; the eNB updates the MCCH message and the MBMS service is transmitted through the MBSFN.

Resuming the MBMS service means that the MCE sends MBMS scheduling information to the eNB through an M2 interface and adds the resumed MBMS service in the MBMS scheduling information;

the step that the eNB updates the MCCH message means that the eNB adds the resumed MBMS service in the MCCH message according to an indication of the MBMS scheduling information:

the step that the MBMS service is transmitted through the MBSFN means that the eNB(s) in the MBSFN area sends (send) the MBMS service data by adopting an MBSFN mode on a corresponding time-frequency resource according to the indication of the MCCH message and the MCH Scheduling Information (MSI).

Step 106: the UE reads the updated MCCH message and receives the resumed MBMS service on the corresponding radio resource.

Since the UE continues reading the MCCH message periodically after the MBMS service is suspended, the UE can read the updated MCCH message;

the corresponding radio resource refers to a radio resource in which the MBMS service indicated according to the MCCH message and the MSI is located;

the resumed MBMS service is different from a new MBMS service; the resumed MBMS service refers to an MBMS service started after the suspension time, while the new MBMS service refers to an MBMS service started from the beginning. Given that the eNB saves the context of the suspended MBMS service, the new MBMS service needs to be subjected to an MBMS session start process, while the resumed MBMS service generally does not need to be subjected to the MBMS session start process; therefore, the eNB can tell the resumed MBMS service from the new MBMS service.

Embodiment 2

Figure 4:
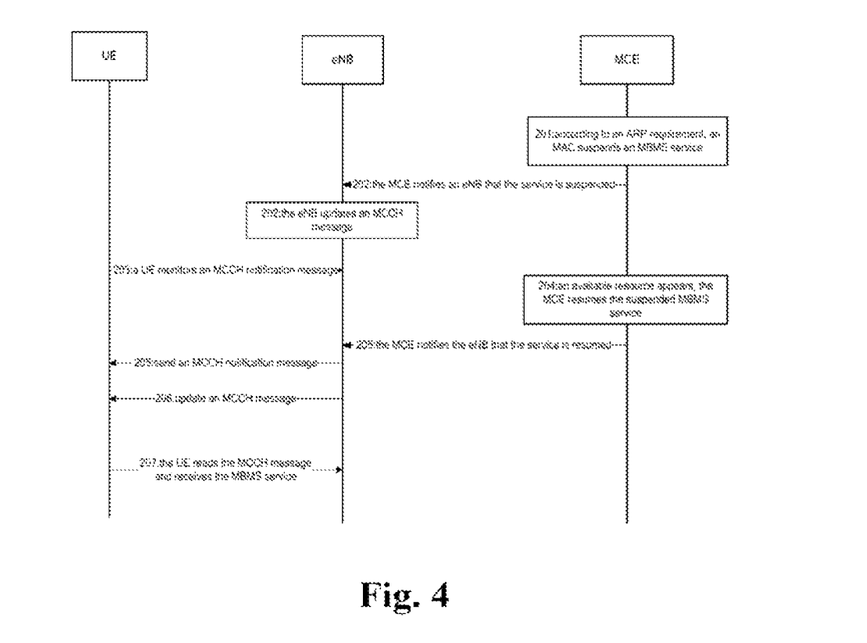
FIG. 4 shows a flowchart of an Embodiment 2 of a method for determining the resumption of a suspended MBMS service of the disclosure.

The scenario of this embodiment is that: an MCE decides to suspend a certain MBMS service based on an ARP requirement; after a period of time, an available radio resource appears in a system, and the MCE decides to resume the MBMS service and adopts the technical solution described in the Solution 2 to perform notification of the resumed MBMS service. FIG. 4 shows a flowchart of the Embodiment 2 of a method for determining the resumption of a suspended MBMS service of the disclosure; as shown in FIG. 4, this embodiment comprises the following steps:

Step 201: an MCE decides to suspend a certain MBMS service based on an ARP requirement.

Being based on an ARP requirement means that: a new MBMS service A needs to be sent; an MBSFN area has no available radio resource currently; the priority of the service A is relatively higher; there is an MBMS service B being sent with a relatively lower priority in the MBSFN area, wherein the priority of the service B is lower than that of the service A, based on an ARP Pre-emption principle, the service A can pre-empt the radio resource of the service B, namely, the service B is suspended and the corresponding radio resource is released for transmitting the service A.

The suspended MBMS service can be cached in an eNB; a context of the MBMS service includes but is not limited to: MBMS service identifier, MBMS service suspension time identifier (that is, MBMS service stop time), MBSFN area identifier of the MBMS service, and the like;

the MBMS service can be a service being sent or to be sent.

Step 202: the MCE sends MBMS scheduling information to an eNB to indicate that the MBMS service is suspended; and the eNB updates an MCCH message.

Indicating that the MBMS service is suspended means that the MCE sends an indication of the MBMS scheduling information to the eNB in the MBSFN area through an M2 interface and deletes the suspended MBMS service from the MBMS scheduling information;

the step that the eNB updates the MCCH message means that the eNB deletes the suspended MBMS service in the MCCH;

the MCE can notify a corresponding MME after suspending the MBMS service;

the eNB can indicate that the MBMS service is suspended in the updated MCCH message.

Step 203: after the MBMS service is suspended, the UE stops receiving the MCCH message and monitors an MCCH notification message.

The step that the UE stops receiving the MCCH message means that: the UE, which is receiving the MBMS service before this MBMS service is suspended, needs to read the MCCH message periodically; when the MBMS service is suspended, the MBMS service is deleted from the MCCH message; the UE does not find the needed service when reading the MCCH message, then the UE stops reading the MCCH message but monitors an MCCH notification message;

the MCCH message refers to an MCCH message corresponding to the suspended MBMS service.

Step 204: after a period of time, an available radio resource appears in an MBSFN area and the MCE decides to resume the suspended MBMS service.

The length of the period of time is related to duration of the MBMS service being sent, an MCCH modification period, an MCE function implementation and an ARP parameter;

the MCE performs management of a radio resource in the MBSFN area, for example, judging whether an available radio resource exists using a call access control function; the available radio resource refers to a resource meeting the retransmission of the suspended MBMS service;

resuming the MBMS service is as described in Step 104, and no further description is needed here.

Step 205: the MCE indicates to the eNB that the MBMS service is resumed through MBMS scheduling information; and the eNB sends an MCCH notification message to indicate that the MBMS service is resumed.

Figure 2:
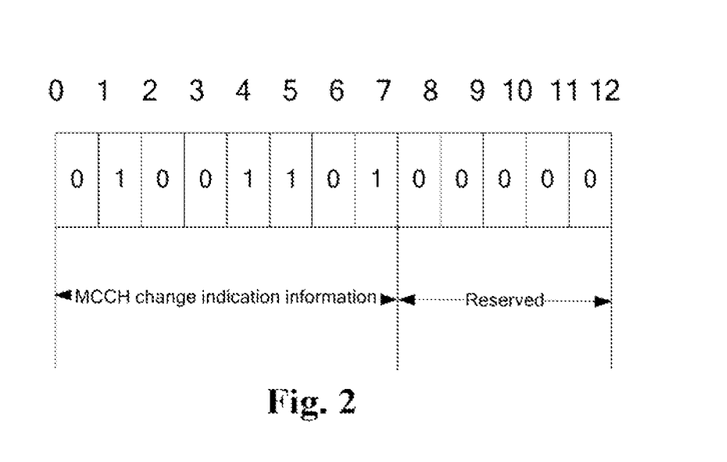
FIG. 2 shows a diagram of a DCI bit corresponding to an M-RNTI in an MCCH notification message.

The MBMS scheduling information is sent through an M2 interface; and the resumed MBMS service is added in the MBMS scheduling information;

the eNB can tell the resumed MBMS service from a new MBMS service, because the eNB saves the context of the suspended MBMS service;

the eNB bears MCCH notification information on a PDCCH, wherein the MCCH notification information contains MCCH indication information and triggering event indication information;

a network side configures a DCI format of downlink control information of the PDCCH, and bears the MCCH indication information and the triggering event indication information in the configured DCI, wherein the MCCH indication information is configured to indicate an MCCH changed in a next modification period;

the triggering event indication information contains session start indication information, and/or counting request indication information, and/or MBMS service resumption information;

both the MCCH indication and the triggering event indication are implemented by a bit mapping mode; the MCCH indication information is N bits set in the configured DCI; the triggering event indication information is implicitly indicated, namely, the N bits for indicating the MCCH are simultaneously used for indicating the triggering event; specifically, if a bit is equal to 1, it is indicated that a corresponding MCCH would change in a next modification period, wherein the reason of the change might be session start, and/or counting request indication, and/or MBMS service resumption; if a bit is equal to 0, it is indicated that a corresponding MCCH keeps unchanged in a next modification period; wherein N is a maximum number of MCCHs supported by overlapped areas in a system, and N=8; FIG. 2 shows a diagram of a DCI bit corresponding to an M-RNTI in an MCCH notification message; FIG. 2 shows a diagram of an indication of an MCCH notification message in a DCI; the bit shown in FIG. 2 means that MCCHs 1, 4, 5, 7 would change in a next modification period, wherein the reason of the change might be session start, and/or counting request indication, and/or MBMS service resumption; and the specific reason needs to be determined after the UE further reads the updated MCCH message; if the MCCH message has a counting request message, it is indicated that the reason of the change is the counting request; if the MCH message has the suspended MBMS service, it is indicated that the reason of the change is the MBMS service resumption; if the MCCH message has a new MBMS service, it is indicated that the reason of the change is the session start. It is worth mentioning that the above thee triggering events can appear simultaneously, or appear in a combination mode, or appear separately.

if the UE already knows a corresponding relationship between the MBMS service and the MCCH, the UE only monitors the corresponding MCCH notification message; otherwise, the UE monitors all MCCH notification messages.

Step 206: the eNB updates the MCCH message and the MBMS service is transmitted through the MBSFN.

The step that the eNB updates the MCCH message means that the eNB adds the resumed MBMS service in the MCCH message according to an indication of the MBMS scheduling information;

the step that the MBMS service is transmitted through the MBSFN means that the eNB(s) in the MBSFN area sends (send) the MBMS service data by adopting an MBSFN mode on a corresponding time-frequency resource according to the indication of the MCCH message and the MCH Scheduling Information (MSI).

Step 207: the UE reads the MCCH message according to the MCCH notification message and receives the resumed MBMS service.

The step that the UE reads the MCCH message according to the MCCH notification message means that: the UE detects that the MCCH changes according to the notification message; the UE reads the MCCH message in a next MCCH modification period; if the suspended MBMS service is found in the updated MCCH message, it is indicated that the network side resumes the MBMS service;

receiving the resumed MBMS service means that: the UE receives the MBMS service data on a corresponding radio resource according to the indication of the MCCH message and the MSI;

the resumed MBMS service is different from a new MBMS service: the resumed MBMS service refers to an MBMS service started after the suspension time, while the new MBMS service refers to an MBMS service started from the beginning. Given that the eNB saves the context of the suspended MBMS service, the new MBMS service needs to be subjected to an MBMS session start process, while the resumed MBMS service generally does not need to be subjected to the MBMS session start process; therefore, the eNB can tell the resumed MBMS service from the new MBMS service.

Embodiment 3

Figure 5:
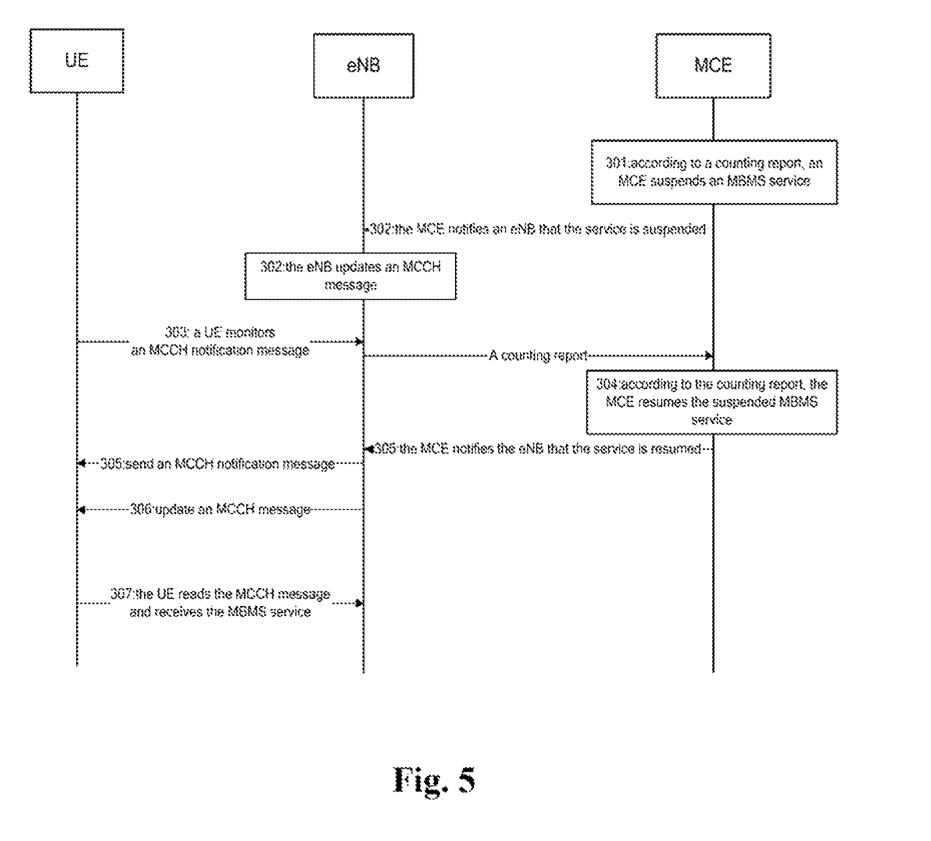
FIG. 5 shows a flowchart of an Embodiment 3 of a method for determining the resumption of a suspended MBMS service of the disclosure.

The scenario of this embodiment is that: an MCE decides to suspend a certain MBMS service according to a counting report; after a period of time, the MCE decides to resume the MBMS service according to a new counting report and adopts the technical solution described in the Solution 2 to perform notification of the resumed MBMS service. FIG. 5 shows a flowchart of the Embodiment 3 of a method for determining the resumption of a suspended MBMS service of the disclosure; as shown in FIG. 5, the embodiment specifically comprises the following steps:

Step 301: an MCE decides to suspend a certain MBMS service according to a counting report in an MBSFN area.

Step 302: the MCE sends MBMS scheduling information to an eNB to indicate that the MBMS service is suspended; and the eNB updates an MCCH message.

Step 303: after the MBMS service is suspended, the UE stops receiving the MCCH message but monitors an MCCH notification message.

Step 304: after a period of time, the MCE decides to resume an MBSFN transmission of the MBMS service according to a new counting report.

Step 305: the MCE indicates to the eNB that the MBMS service is resumed through MBMS scheduling information; and the eNB sends an MCCH notification message to indicate that the MBMS service is resumed.

Step 306: the eNB updates the MCCH message and the MBMS service is transmitted through the MBSFN.

Step 307: the UE reads the MCCH message according to the MCCH notification message and receives the resumed MBMS service.

Embodiment 4

Figure 6:
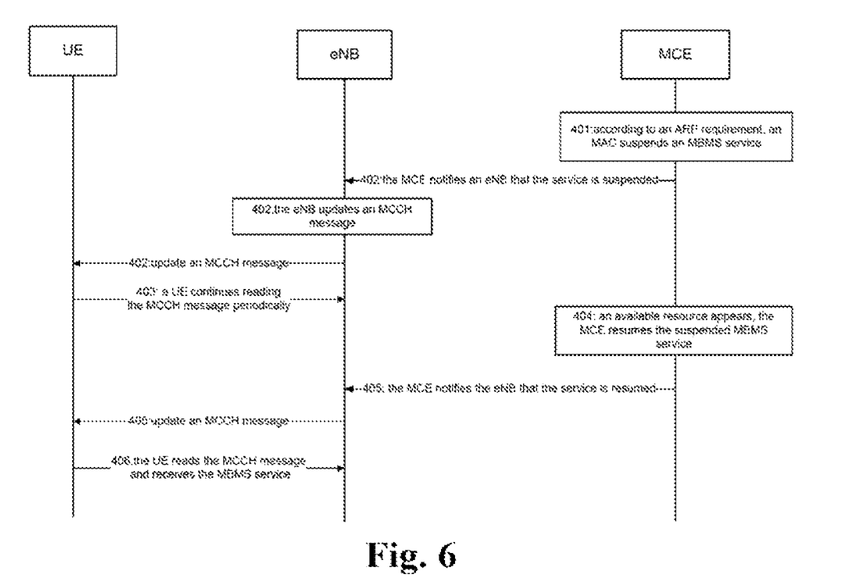
FIG. 6 shows a flowchart of an Embodiment 4 of a method for determining the resumption of a suspended MBMS service of the disclosure.

The scenario of this embodiment is that: an MCE decides to suspend a certain MBMS service based on an ARP requirement; after a period of time, an available radio resource appears in a system, and the MCE decides to resume the MBMS service and adopts the technical solution described in the Solution 1 to perform reception of the resumed MBMS service. FIG. 6 shows a flowchart of the Embodiment 4 of a method for determining the resumption of a suspended MBMS service of the disclosure; as shown in FIG. 6, this embodiment specifically comprises the following steps:

Step 401: an MCE decides to suspend a certain MBMS service based on an ARP requirement.

Step 402: the MCE sends MBMS scheduling information to an eNB to indicate that the MBMS service is suspended; and the eNB updates an MCCH message according to the scheduling information.

Step 403: after the MBMS service is suspended, the UE continues reading the MCCH message periodically.

Step 404: after a period of time, an available radio resource appears in an MBSFN area and the MCE decides to resume the suspended MBMS service.

Step 405: the MCE notifies the eNB that the MBMS service is resumed; the eNB updates the MCCH message and the MBMS service is transmitted through the MBSFN.

Step 406: the UE reads the updated MCCH message and receives the resumed MBMS service on the corresponding radio resource.

Figure 7:
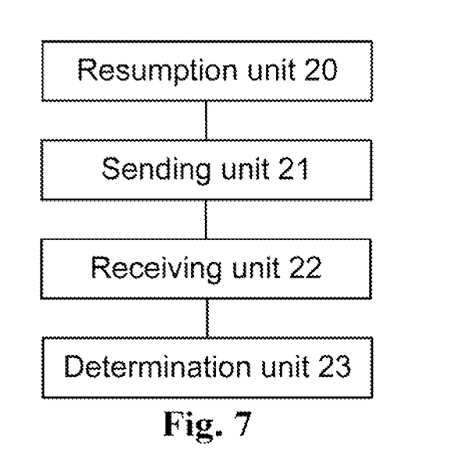
FIG. 7 shows a structure diagram of a device for determining the resumption of a suspended MBMS service of the disclosure.

FIG. 7 shows a structure diagram of a device for determining the resumption of a suspended MBMS service of the disclosure; as shown in FIG. 7, the device for determining the resumption of the suspended MBMS service of the disclosure comprises a resumption unit 20 and a sending unit 21 which are located at a network side, and a receiving unit 22 and a determination unit 23 which are located at a UE side, wherein the resumption unit 20 is configured to resume the suspended MBMS service and trigger the sending unit;

the sending unit 21 is configured to send an MCCH notification message for indicating a change of an MCCH message;

the receiving unit 22 is configured to receive the MCCH notification message and a changed MCCH message;

the determination unit 23 is configured to determine that the suspended MBMS service is resumed according to the MCCH notification message and the changed MCCH message.

The changed MCCH message refers to an MCCH message which is updated in a next MCCH modification period of the MCCH notification message.

On the basis of the device for determining the resumption of the suspended MBMS service shown in FIG. 7, the device for determining the resumption of the suspended MBMS service of the disclosure further comprises a reading unit (not shown in FIG. 7) located at the UE side and configured to resume reception of the MCCH and to receive the resumed MBMS service again using the receiving unit 22, after the determination unit 23 determines that the suspended MBMS service is resumed.

In this disclosure, the MBMS service being suspended does not include an MBMS service interruption caused by the network side sending an MBMS session stop request message, or an MBMS service interruption caused by the UE's own behaviour.

The MCCH notification message can be an MCCH change notification message; and the network side is an eNB.

Figure 8:
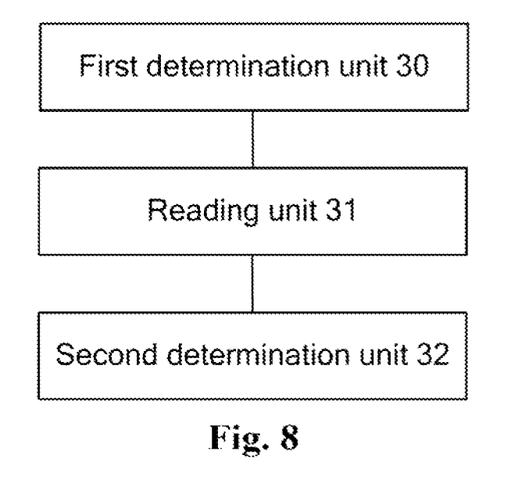
FIG. 8 shows a structure diagram of a device for determining the resumption of a suspended MBMS service of the disclosure.

FIG. 8 shows another structure diagram of a device for determining the resumption of a suspended MBMS service of the disclosure; as shown in FIG. 8, the device for determining the resumption of the suspended MBMS service of the disclosure comprises a first determination unit 30, a reading unit 31 and a second determination unit 32, wherein the first determination unit 30 is configured to trigger the reading unit 31 after determining that the MBMS service is suspended;

the reading unit 31 is configured to continue reading an MCCH periodically;

the second determination unit 32 is configured to determine that the suspended MBMS service is resumed when determining that the MCCH contains indication information of the suspended MBMS service.

on the basis of the device for determining the resumption of the suspended MBMS service shown in FIG. 8, the device for determining the resumption of the suspended MBMS service of the disclosure further comprises: a receiving unit (not shown in FIG. 8) configured to receive the resumed MBMS service again after the second determination unit 32 determines that the suspended MBMS service is resumed.

Figure 9:
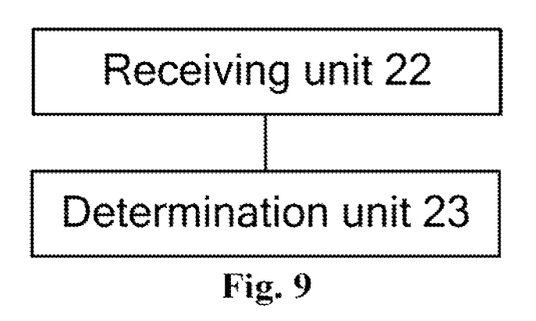
FIG. 9 shows a structure diagram of a UE of the disclosure.

FIG. 9 shows a structure diagram of a UE of the disclosure. As shown in FIG. 9, the UE of the disclosure comprises a receiving unit 40 and a determination unit, 41 wherein the receiving unit 40 is configured to receive an MCCH notification message and an MCCH message;

the determination unit 41 is configured to determine that a suspended MBMS service is resumed.

After the determination unit 41 determines that the suspended MBMS service is resumed, the resumed MBMS service is received again through the receiving unit 40.

The UE of the disclosure also can be a UE having the device for determining the resumption of the suspended MBMS service shown in FIG. 8.

Those skilled in the art should understand that the implementation function of each processing unit included in the device for determining the resumption of the suspended MBMS service shown in FIG. 7 and FIG. 8 can be understood by reference to the related description in the forgoing method for determining the resumption of the suspended MBMS service. The implementation function of each processing unit included in the UE shown in FIG. 9 can be understood by reference to the related description in the forgoing method for determining the resumption of the suspended MBMS service. The function of each unit included in the device and the apparatus shown in FIG. 7, FIG. 8 and FIG. 9 can be implemented by a program running on a processor, or can further be implemented by a corresponding logic circuit.

The above are only the preferred embodiments of the disclosure, and are not intended to limit the scope of protection of the disclosure.

What is claimed is:

1. A method for determining resumption of a suspended Multimedia Broadcast Multicast Service (MBMS), comprising:

when the MBMS service is intended to be resumed after being suspended and the MBMS service being suspended does not include an MBMS service interruption, which is caused by the network side sending an MBMS session stop request message, or caused by an MBMS service interruption caused by the UE's own behaviour, triggering a network side to send an MBMS Control Channel (MCCH) notification message for indicating a change of an MCCH message; and determining, by User Equipment (UE), that the suspended MBMS service is resumed by reading the MCCH notification message and the changed MCCH message, wherein the changed MCCH message is, after the UE detects that the MCCH changes according to the MCCH notification message, an updated MCCH message read by the UE in a next MCCH modification period.

2. The method according to claim 1, wherein after determining, by the UE, that the suspended MBMS service is resumed by reading the MCCH notification message and the changed MCCH message, the method further comprising:

the UE resuming reception of the changed MCCH message and receiving the resumed MBMS service again.

3. The method according to claim 2, wherein the MCCH notification message is an MCCH change notification message; and the network side is an evolved NodeB (eNB).

4. The method according to claim 1, wherein, when the MBMS service is suspended, the network side suspends the MCCH notification message corresponding to the MBMS service.

5. The method according to claim 4, wherein the MCCH notification message is an MCCH change notification message; and the network side is an evolved NodeB (eNB).

6. The method according to claim 1, wherein the MCCH notification message is an MCCH change notification message; and the network side is an evolved NodeB (eNB).

7. A method for determining resumption of a suspended Multimedia Broadcast Multicast Service (MBMS), comprising:

a UE continuing reading an MBMS Control Channel (MCCH) periodically after determining that the MBMS service is suspended, and determining that the suspended MBMS service is resumed when the MCCH contains indication information of the suspended MBMS service and the MBMS service being suspended does not include an MBMS service interruption caused by a network side sending an MBMS session stop request message, or an MBMS service interruption caused by the UE's own behaviour, wherein the UE determines that the suspended MBMS service is resumed by reading an MCCH notification message and a changed MCCH message, wherein the changed MCCH message is, after the UE detects that the MCCH changes according to the MCCH notification message, an updated MCCH message read by the UE in a next MCCH modification period.

8. The method according to claim 7, wherein after the UE determining that the suspended MBMS service is resumed, the method further comprising:

receiving, by the UE, the resumed MBMS service again.

9. A device for determining resumption of a suspended Multimedia Broadcast Multicast Service (MBMS), comprising: a resumption unit and an indication unit that are located at a network side, and a receiving unit and a determination unit that are located at a UE side, wherein the resumption unit is configured to resume the suspended MBMS service and trigger a sending unit;

the sending unit is configured to send an MBMS Control Channel (MCCH) notification message for indicating a change of an MCCH message;

the receiving unit is configured to receive the MCCH notification message and the changed MCCH message, wherein the changed MCCH message is, after the UE detects that the MCCH changes according to the MCCH notification message, an updated MCCH message read by the UE in a next MCCH modification period;

the determination unit is configured to determine that the suspended MBMS service is resumed according to the MCCH notification message and the changed MCCH message, wherein the MBMS service being suspended does not include an MBMS service interruption, which is caused by the network side sending an MBMS session stop request message, or caused by an MBMS service interruption caused by the UE's own behaviour.

10. The device according to claim 9, further comprising:

a reading unit configured to resume reception of the changed MCCH message after the determination unit determines that the suspended MBMS service is resumed and to receive the resumed MBMS service again using the receiving unit.

11. A device for determining resumption of a suspended Multimedia Broadcast Multicast Service (MBMS), comprising: a first determination unit, a reading unit and a second determination unit, wherein the first determination unit is configured to trigger the reading unit after determining that the MBMS service is suspended;

the reading unit is configured to continue reading an MBMS Control Channel (MCCH) periodically;

the second determination unit is configured to determine that the suspended MBMS service is resumed when determining that the MCCH contains indication information of the suspended MBMS service, wherein the second determination unit determines that the suspended MBMS service is resumed by reading an MCCH notification message and a changed MCCH message, wherein the changed MCCH message is, after the second determination unit detects that the MCCH changes according to the MCCH notification message, an updated MCCH message read by the reading unit in a next MCCH modification period;

wherein the MBMS service being suspended does not include an MBMS service interruption, which is caused by the network side sending an MBMS session stop request message, or caused by an MBMS service interruption caused by the UE's own behaviour.

12. The device according to claim 11, further comprising:

a receiving unit configured to receive the resumed MBMS service again after the second determination unit determines that the suspended MBMS service is resumed.

13. A UE having an MBMS information reception capacity, comprising a receiving unit and a determination unit, wherein the receiving unit is configured to receive an MCCH notification message and an MCCH message;

the determination unit is configured to determine that a suspended MBMS service is resumed, wherein the determination unit determines that the suspended MBMS service is resumed by reading the MCCH notification message and the MCCH message, wherein the MCCH message is, after the determination unit detects that the MCCH changes according to the MCCH notification message, an updated MCCH message read by the determination unit in a next MCCH modification period;

wherein the MBMS service being suspended does not include an MBMS service interruption, which is caused by the network side sending an MBMS session stop request message, or caused by an MBMS service interruption caused by the UE's own behaviour.

* * * * *